(12) United States Patent
Suri et al.

(10) Patent No.: US 12,392,018 B2
(45) Date of Patent: Aug. 19, 2025

(54) THREE-DIMENSIONAL PRINTING WITH GAS-ATOMIZED STAINLESS STEEL PARTICLES

(71) Applicant: PERIDOT PRINT LLC, Palo Alto, CA (US)

(72) Inventors: Pavan Suri, Corvallis, OR (US); Mackensie C. Smith, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 423 days.

(21) Appl. No.: 17/637,651

(22) PCT Filed: Oct. 22, 2019

(86) PCT No.: PCT/US2019/057388
§ 371 (c)(1),
(2) Date: Feb. 23, 2022

(87) PCT Pub. No.: WO2021/080568
PCT Pub. Date: Apr. 29, 2021

(65) Prior Publication Data
US 2022/0274176 A1 Sep. 1, 2022

(51) Int. Cl.
*C22C 38/42* (2006.01)
*B22F 1/052* (2022.01)
(Continued)

(52) U.S. Cl.
CPC .............. *C22C 38/42* (2013.01); *B22F 1/052* (2022.01); *B22F 10/14* (2021.01); *B22F 12/17* (2021.01);
(Continued)

(58) Field of Classification Search
CPC .... B22F 1/052; B22F 10/14; B22F 2201/013; B22F 2301/35; B22F 2304/10; B33Y 10/00; B33Y 70/00; B29C 64/165
See application file for complete search history.

(56) References Cited

U.S. PATENT DOCUMENTS 9,732,244 B2* 8/2017 Ingle, Jr. ............... C09D 11/12
2002/0189405 A1 12/2002 Liu et al.
(Continued)

FOREIGN PATENT DOCUMENTS

CN 103386492 A 11/2013
CN 104325136 A 2/2015
(Continued)

OTHER PUBLICATIONS

Tamura Takyauki et.al. [JP2016125124A] (machine translation) (Year: 2016).*
(Continued)

*Primary Examiner* — Sally A Merkling
*Assistant Examiner* — Nazmun Nahar Shams
(74) *Attorney, Agent, or Firm* — Dierker & Kavanaugh, P.C.

(57) ABSTRACT

A three-dimensional printing kit can include a binding agent and a particulate build material. The binding agent can include a binder in a liquid vehicle. The particulate build material can include from about 80 wt % to 100 wt % gas-atomized stainless steel particles. The gas-atomized stainless steel particles can include from about 3 wt % to about 15 wt % nickel and from about 10 wt % to about 20 wt % chromium and can have an average oxygen content of from about 1200 ppm to about 2200 ppm by weight.

15 Claims, 2 Drawing Sheets

(51) Int. Cl.
*B22F 10/14* (2021.01)
*B22F 12/17* (2021.01)
*B33Y 10/00* (2015.01)
*B33Y 30/00* (2015.01)
*B33Y 70/00* (2020.01)

(52) U.S. Cl.
CPC ............... *B33Y 10/00* (2014.12); *B33Y 30/00* (2014.12); *B33Y 70/00* (2014.12); *B22F 2201/013* (2013.01); *B22F 2301/15* (2013.01); *B22F 2301/35* (2013.01); *B22F 2304/10* (2013.01)

(56) References Cited

U.S. PATENT DOCUMENTS

| | | |
|---|---|---|
| 2011/0314964 A1 | 12/2011 | Ishigami et al. |
| 2015/0251247 A1 | 9/2015 | Monsheimer et al. |
| 2016/0228948 A1 | 8/2016 | Nakamura |
| 2016/0318103 A1* | 11/2016 | Allroth ................. C22C 38/002 |
| 2017/0045838 A1 | 2/2017 | Chang et al. |
| 2017/0087632 A1 | 3/2017 | Mark |
| 2017/0327701 A1* | 11/2017 | Connor ................... C22C 27/06 |
| 2018/0147777 A1 | 5/2018 | Abbott et al. |
| 2019/0091936 A1 | 3/2019 | Fornos et al. |
| 2019/0111479 A1 | 4/2019 | Kasperchik et al. |

FOREIGN PATENT DOCUMENTS

| | | | |
|---|---|---|---|
| CN | 104838318 A | 8/2015 | |
| CN | 104858422 A | 8/2015 | |
| CN | 108330396 A | 7/2018 | |
| CN | 108517473 A | 9/2018 | |
| CN | 109570489 A | 4/2019 | |
| EP | 3054024 A1 | 8/2016 | |
| JP | 2015-175026 A | 10/2015 | |
| WO | 2018/156938 A1 | 8/2018 | |
| WO | WO-2018156933 A1 * | 8/2018 | ............ B22F 1/0011 |
| WO | 2019/013745 A1 | 1/2019 | |
| WO | WO-2019231467 A1 * | 12/2019 | ............. B22F 1/052 |

OTHER PUBLICATIONS

Tang, Y. et al., "Elastic modulus of 316 stainless steel lattice structure fabricated via binder jetting process", Materials Science and Technology, vol. 32, No. 7, May 2, 2016, pp. 648-656.

Irukuvarghula, S., et al., "Effect of powder characteristics and oxygen content on modifications to the microstructural topology during hot isostatic pressing of an austenitic steel," Acta Materialia, vol. 172, 2019, pp. 6-17.

* cited by examiner

THREE-DIMENSIONAL PRINTING WITH GAS-ATOMIZED STAINLESS STEEL PARTICLES

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques are considered additive processes because they involve the application of successive layers of material. This is unlike other machining processes, which often rely upon the removal of material to create the final part. Some three-dimensional printing methods use chemical binders or adhesives to bind build materials together. Other three-dimensional printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
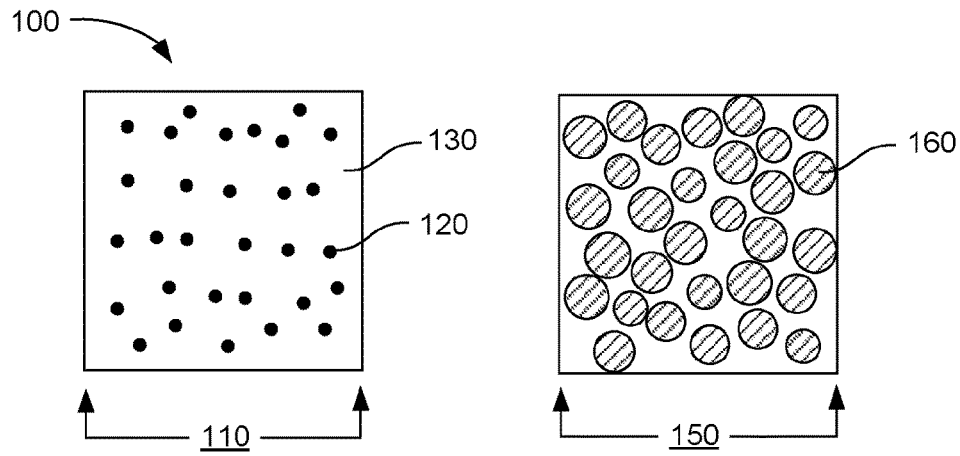
FIG. 1 graphically illustrates an example three-dimensional printing kit in accordance with the present disclosure.

Three-dimensional printing can be an additive process involving the application of successive layers of a particulate build material with a binding agent printed thereon to bind the successive layers of the particulate build materials together. In some processes, application of a binding agent with a binder therein can be utilized to form a green body object or article and then a heat-fused three-dimensional object can be formed therefrom, such as by sintering, annealing, melting, etc. More specifically, a binding agent can be selectively applied to a layer of a particulate build material on a support bed, e.g., a build platform supporting particulate build material, to pattern a selected region of a layer of the particulate build material and then another layer of the particulate build material can be applied thereon. The binding agent can be applied again, and then repeated to form the green part (also known as a green body object or a green body article), which can then be heat-fused to form the fused three-dimensional object.

Stainless steel particles utilized in three-dimensional printing can be less than 45 μm and spherical or substantially spherical. A reduction in particle size can correlate with the density of the fused three-dimensional object. The smaller the particle used to form the three-dimensional object, the stronger and more corrosion resistant the fused three-dimensional object formed therefrom. Thereby utilizing smaller stainless steel particles in three-dimensional printing can be desired. However, stainless steel particles having a size of 45 μm or less can exhibit issues with flowability. These particles can be difficult to spread in a support bed and can clump or pack together in particulate build material packaging, thereby making three-dimensional printing with particles having a size of 45 μm or less difficult.

In accordance with this, a three-dimensional printing kit is presented. The three-dimensional printing kit "kit" can include a binding agent and a particulate build material. The binding agent can include a binder in a liquid vehicle. The particulate build material can include from about 80 wt % to 100 wt % gas-atomized stainless steel particles. The gas-atomized stainless steel particles can include from about 3 wt % to about 15 wt % nickel, from about 10 wt % to about 20 wt % chromium, and can have an average oxygen content of from about 1200 ppm to about 2200 ppm by weight. In an example, the binder can be a latex binder and the binding agent can include from about 2 wt % to about 30 wt % latex particles. In another example, the gas-atomized stainless steel particles can have a D50 particle size ranging from about 5 μm to about 20 μm. In yet another example, the gas-atomized stainless steel particles can have a D90 particle size from about 10 μm to about 30 μm. In a further example, the average oxygen content of the gas-atomized stainless steel particles can range from about 1400 ppm to about 1800 ppm by weight. In one example, the gas-atomized stainless steel particles can include an average carbon content from about 50 ppm to about 1200 ppm by weight. In another example, the gas-atomized stainless steel particles can include from about 10 wt % to about 15 wt % nickel, from about 15 wt % to about 20 wt % chromium, and from about 1.5 wt % to about 4 wt % molybdenum. In yet another example, the gas-atomized stainless steel particles can include from about 3 wt % to about 5 wt % nickel, from about 15 wt % to about 17 wt % chromium, from about 3 wt % to about 5 wt % copper, and from about 0.15 wt % to about 0.45 wt % niobium, tantalum, or a combination of niobium and tantalum. In a further example, the gas-atomized stainless steel particles can have an average aspect ratio from about 1.2:1 to about 1:1.

In another example, a method of three-dimensional printing "method" is presented. The method can include iteratively applying individual build material layers of a particulate build material including from about 80 wt % to 100 wt % gas-atomized stainless steel particles. The gas-atomized stainless steel particles can include from about 3 wt % to about 15 wt % nickel and from about 10 wt % to about 20 wt % chromium. The oxygen content of the gas-atomized stainless steel particles can be from about 1200 ppm to about 2200 ppm by weight. The method can further include, based on a three-dimensional object model, iteratively applying a binding agent to individual build material layers to define individually patterned object layers that become adhered to one another to form a layered green body object and sintering the layered green body object in a fusing oven to form a fused three-dimensional object. In one example, the gas-atomized stainless steel particles can have a D50 particle size ranging from about 5 μm to about 20 μm. In another example, the sintering can occur in an atmosphere containing from about 2.4 vol % to 100 vol % hydrogen. In yet another example, the fused three-dimensional object can have an average oxygen content per fused particle from about 100 ppm to about 800 ppm by weight.

In a further example, a three-dimensional printing system ("system") is presented. The system can include a particulate build material, a fluid applicator, and a binding agent. The particulate build material can include from about 80 wt % to 100 wt % gas-atomized stainless steel particles that can have a D50 particle size from about 5 µm to about 20 µm. The gas-atomized stainless steel particles can include from about 3 wt % to about 15 wt % nickel and from about 10 wt % to about 20 wt % chromium. The average oxygen content of the gas-atomized stainless steel particles can range from about 1200 ppm to about 2200 ppm by weight. The fluid applicator can be fluidly coupled or coupleable to the binding agent including a binder and a liquid vehicle to apply the binding agent to the particulate build material to form a layered green body object. In one example, the system can further include a fusing oven to fuse the gas-atomized stainless steel particles to a temperature where inter-particle fusion occurs. Fused gas-atomized stainless steel particles can have an average oxygen content from about 400 ppm to about 800 ppm by weight.

When discussing the three-dimensional printing kit, the method of three-dimensional printing, and/or the three-dimensional printing system herein, these discussions can be considered applicable to one another whether or not they are explicitly discussed in the context of that example. Thus, for example, when discussing gas-atomized stainless steel particles related to a three-dimensional printing kit, such disclosure is also relevant to and directly supported in the context of the method of three-dimensional printing, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

In accordance with examples of the present disclosure, a three-dimensional printing kit 100 is shown in FIG. 1. The three-dimensional printing kit can include a binding agent 110 and a particulate build material 150. The binding agent can include a binder 120 in a liquid vehicle 130. The particulate build material can include, from about 80 wt % to 100 wt % gas-atomized stainless steel particles 160. The gas-atomized stainless steel particles can include from about 3 wt % to about 15 wt % nickel and from about 10 wt % to about 20 wt % chromium, and can have an average oxygen content from about 1200 ppm to about 2200 ppm by weight. The particulate build material may be packaged or co-packaged with the binding agent in separate containers, and/or can be combined with the binding agent at the time of printing, e.g., loaded together in a three-dimensional printing system.

Methods of Three-Dimensional Printing

Figure 2:
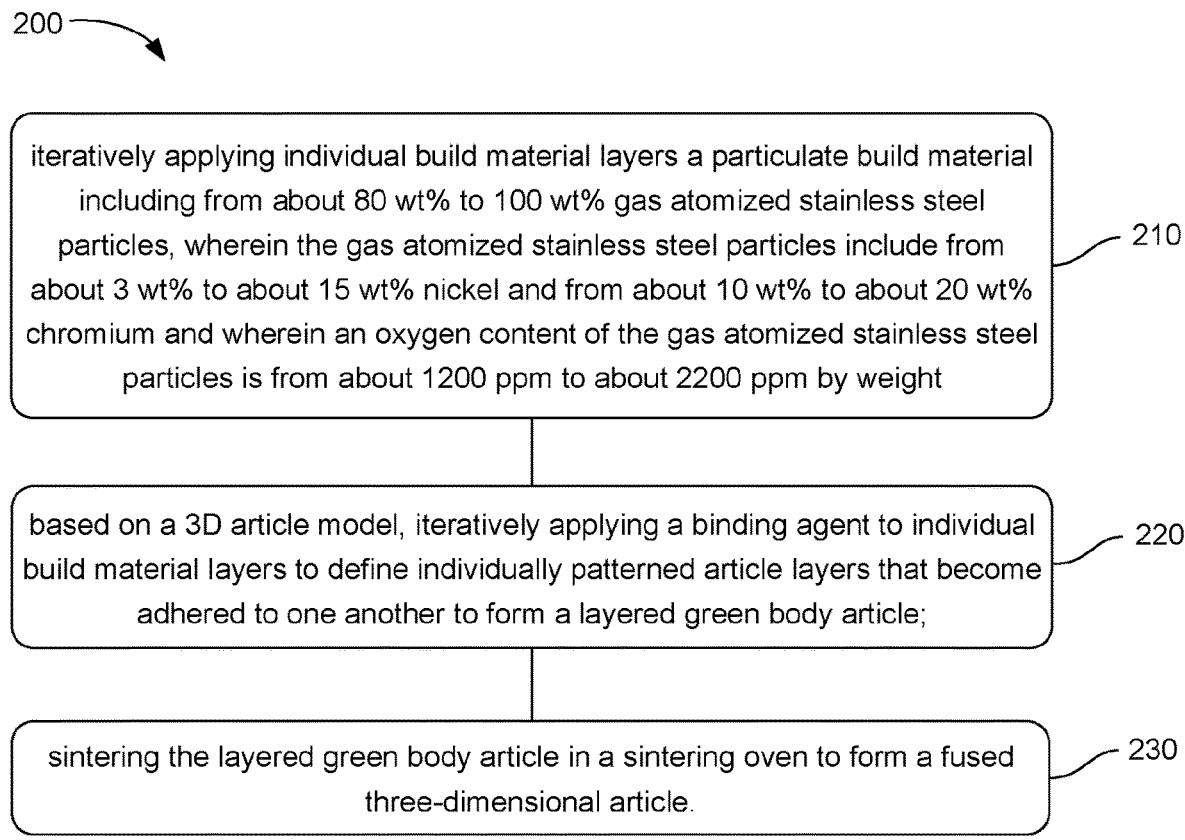
FIG. 2 is a flow diagram illustrating an example method of three-dimensional printing in accordance with the present disclosure.

A flow diagram of an example method 200 of three-dimensional printing is shown in FIG. 2. The method can include iteratively applying 210 individual build material layers of a particulate build material including from about 80 wt % to 100 wt % gas-atomized stainless steel particles; based on a three-dimensional object model, iteratively applying 220 a binding agent to individual build material layers to define individually patterned object layers that become adhered to one another to form a layered green body object; and sintering 230 the layered green body object in a fusing oven to form a fused three-dimensional object. The gas-atomized stainless steel particles can include from about 3 wt % to about 15 wt % nickel, from about 10 wt % to about 20 wt % chromium and can have an oxygen content ranging from about 1200 ppm to about 2200 ppm by weight.

In printing in a layer-by-layer manner, the particulate build material can be spread, the binding agent applied, and a build platform can then be dropped a distance of (x), which can correspond to the thickness of a printed layer of the green body object, so that another layer of the particulate build material can be added again thereon to receive another application of binding agent, and so forth. This process can be repeated on a layer by layer basis until the entire green body object is formed. A "green" body object (or individual layer) can refer to any component or mixture of components that are not yet sintered or annealed, but which are held together in a manner sufficient to permit heat-fusing, e.g., handling, moving, or otherwise preparing the part for heat-fusing. During the build, in one example, heat can be applied from overhead and/or can be provided by the build platform from beneath the particulate build material to drive off water and/or other liquid components, as well as to further solidify the layer of the green body object. In other examples, the particulate build material can be heated prior to dispensing.

Following the formation of the green body object, the entire green body object can be moved to an oven and fused by sintering and/or annealing. The term "sinter" or "sintering" refers to the consolidation and physical bonding of the gas-atomized stainless steel particles together (after temporary binding using the binding agent) by solid state diffusion bonding, partial melting of gas-atomized stainless steel particles, or a combination of solid state diffusion bonding and partial melting. The term "anneal" or "annealing" refers to a heating and cooling sequence that controls the heating process and the cooling process, e.g., slow cooling in some instances can remove internal stresses and/or toughen the heat-fused part or object. In some examples, the sintering can melt an outer layer and can cause particle surfaces of individual particulate build material particles to become physically merged or composited together, while not melting an inner portion of the particles.

The sintering temperatures and temperature profiles used can vary (within a heat-fusing temperature range, using any of a number of heat ramp up and/or cooling ramp down profiles, etc.), depending on the particle size. In one example, the gas-atomized sintering temperature can range from about 10° C. below the melting temperature of the gas-atomized stainless steel particles of the particulate build material to about 50° C. below the melting temperature of the gas-atomized stainless steel particles of the particulate build material. If there are multiple types of particles present, then the sintering temperature range can be based on a melting temperature of the most prevalent particles in the particulate build material, e.g. the type of particles that make up the bulk of the particulate build material. The sintering temperature can also depend upon a period of time that heating occurs, e.g., at an elevated temperature for a sufficient time to cause particle surfaces to become physically merged or composited together. In one example, sintering of the green body object can occur at a temperature ranging from about 1,250° C. to about 1,430° C. for a time period ranging from about 10 minutes to about 10 hours to fuse the metal particles together and form a fused three-dimensional object. In some examples, the temperature can range from about 1,300° C. to about 1,420° C., from about 1,300° C. to about 1,400° C., or from about 1,250° C. to about 1,400° C.

The sintering can occur in a gas atmosphere. The atmosphere can include a noble gas, an inert gas, a reactive gas, or a combination thereof. The atmosphere can include from about 2.4 vol % to 100 vol %, from about 25 vol % to about 75 vol %, or from about 50 vol % to about 90 vol % hydrogen gas. In further examples, the sintering can include vacuuming a fusing oven to a pressure that can range about 0.1 pascal (Pa) to about 7 Pa, from about 0.5 Pa to about 6 Pa, or from about 1 Pa to about 5 Pa. In other examples, the method can result in a fused three-dimensional object that can have an average oxygen content from about 100 ppm to about 800 ppm by weight, from about 250 ppm to about 750 ppm, or from about 400 ppm to about 800 ppm. In some examples, the method can result in a fused three-dimensional object that can have a theoretical density that can range from about 93% to about 99%, from about 93% to about 96%, or from about 95% to about 98.5%.

Three-Dimensional Printing Systems

Figure 3:
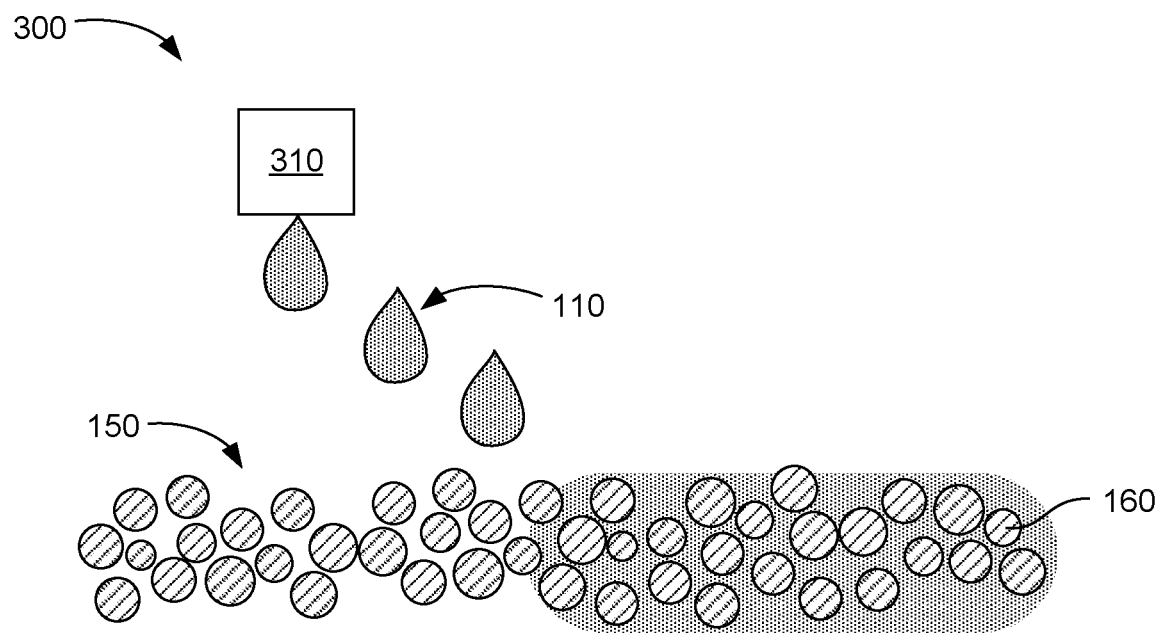
FIG. 3 graphically illustrates an example three-dimensional printing system in accordance with the present disclosure.

A three-dimensional printing system 300 is also presented. As illustrated in FIG. 3, the system can include a particulate build material 150 and a binding agent 110. The binding agent can be applied to the particulate build material using a fluid applicator 310, for example. The particulate build material can include from about 80 wt % to 100 wt % gas-atomized stainless steel particles 160. The gas-atomized stainless steel particles can include from about 3 wt % to about 15 wt % nickel, from about 10 wt % to about 20 wt % chromium, and an average oxygen content of the gas-atomized stainless steel particles can range from about 1200 ppm to about 2200 ppm by weight.

The fluid applicator can be fluidly coupled or coupleable to the binding agent to iteratively apply the binding agent to the particulate build material to form individually patterned object layers of a green body object. The fluid applicator can be on a carriage track or any of a number of structures. The fluid applicator can be fluidly coupled or coupleable to the binding agent and directable to apply the binding agent to the particulate build material to form a layered green body object. The fluid applicator can be any type of apparatus capable of selectively applying the binding agent. For example, the fluid applicator can be a fluid ejector or digital fluid ejector, such as an inkjet printhead, e.g., a piezo-electric printhead, a thermal printhead, a continuous printhead, etc. The fluid applicator could likewise be a sprayer, a dropper, or other similar structure for applying the binding agent to the particulate build material. Thus, in some examples, the application can be carried out by jetting or ejecting from a digital fluid jet applicator, similar to an inkjet pen. In yet another example, the fluid applicator can include a motor and can be operable to move back and forth over the particulate build material along a carriage when positioned over or adjacent to a powder bed of a build platform.

Figure 4:
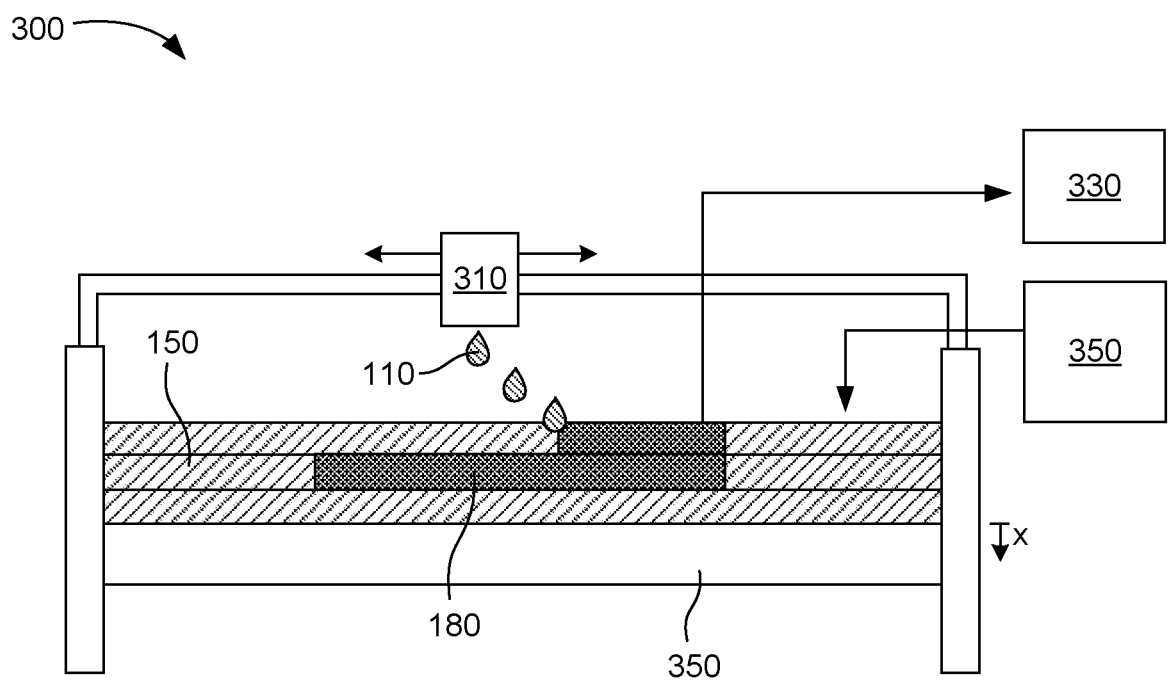
FIG. 4 graphically illustrates an example three-dimensional printing system in accordance with the present disclosure.

In an example, the system 300 can further include a build platform 350 to support the particulate build material 150 and/or a fusing oven 330 as illustrated in FIG. 4. The build platform can be positioned to receive the binding agent 110 from the fluid applicator 310 onto a layer of the particulate build material. The build platform can be controlled to drop in height (shown at "x"), thus allowing for successive layers of particulate build material to be applied by a supply and/or spreader 350. The particulate build material can be layered in the build platform at a thickness that can range from about 5 μm to about 1 cm. In some examples, individual layers can have a relatively uniform thickness. In one example, a thickness of a layer of the particulate build material can range from about 10 μm to about 500 μm, or from about 30 μm to about 200 μm. The green body object 180 can then be transferred to the fusing oven.

In some examples, the system can further include a fusing oven that can fuse the gas-atomized stainless steel particles of the green body object (formed from the particulate build material with binding agent applied thereto) and cause the green body object to become fused. In some examples, the fusing oven can include a controlled atmosphere, which may include controlling atmospheric pressure or gas content in the atmosphere during the heat-fusing process. For example, as mentioned, the pressure within the fusing oven can be a vacuum pressure ranging about 0.1 pascal (Pa) to about 7 Pa, from about 0.5 Pa to about 6 Pa, or from about 1 Pa to about 5 Pa. In some examples, the controlled atmosphere can include an inert atmosphere of a noble gas, an inert gas, a reactive gas, or a combination thereof.

Binding Agents

In further detail, regarding the binding agent that may be utilized in the three-dimensional printing kit, the method of three-dimensional printing, or the three-dimensional printing system, as described herein, the binding agent can include a binder and a liquid vehicle. The term "binder" can include any material used to physically bind separate gas-atomized stainless steel particles together or facilitate adhesion to a surface of adjacent gas-atomized stainless steel particles in order to prepare a green part or green body object in preparation for subsequent heat-fusing, e.g., sintering, annealing, melting, etc. During three-dimensional printing, a binding agent can be applied to the particulate build material on a layer by layer basis. The liquid vehicle of the binding agent can be capable of wetting a particulate build material and the binder can move into vacant spaces between particles of the particulate build material, for example.

The binding agent can provide binding to the particulate build material upon application, or in some instances, can be activated after application to provide binding. The binder can be activated or cured by heating the binder (which may be accomplished by heating an entire layer of the particulate build material on a portion of the binding agent which has been selectively applied). If the binder includes a polymer binder, then the heating may occur at about the glass transition temperature of the polymer binder, for example. When activated or cured, the binder can then form a network that can adhere or glue the particles of the particulate build material together, thus providing cohesiveness in forming and/or holding the shape of the green body object or a printed layer thereof.

Thus, in one example, the green body object can have the mechanical strength to withstand extraction from a powder bed and can then be sintered to form a heat-fused object. Once the green body object is sintered, that object is then herein referred to as a "fused" three-dimensional object, part, or article. In some examples, the binder contained in the binding agent can undergo a pyrolysis or burnout process where the binder may be removed during sintering or annealing. This can occur where the thermal energy applied to a green body part or object removes inorganic or organic volatiles and/or other materials that may be present either by decomposition or by burning the binding agent. In other examples, if the binder includes a metal, such as a reducible metal compound, then the metal binder may remain with the heat-fused object after sintering or annealing.

The binder can be included, as mentioned, in a liquid vehicle for application to the particulate build material. For example, the binder can be present in the binding agent at from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt %.

In one example, the binder can include polymer particles, such as latex polymer particles. In an example, the binder can include from about 2 wt % to about 30 wt % latex particles. The polymer particles can have an average particle size that can range from about 100 nm to about 1 μm. In other examples, the polymer particles can have an average particle size that can range from about 150 nm to about 300 nm, from about 200 nm to about 500 nm, or from about 250 nm to 750 nm.

In one example, the latex particles can include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

With respect to the liquid vehicle, binding agent can include from about 50 wt % to about 99 wt %, from about 70 wt % to about 98 wt %, from about 80 wt % to about 98 wt %, from about 60 wt % to about 95 wt %, or from about 70 wt % to about 95 wt % liquid vehicle, based on the weight of the binding agent as a whole. In one example, the liquid vehicle can include water as a major solvent, e.g., the solvent present at the highest concentration when compared to other co-solvents. In another example, the liquid vehicle can further include from about 0.1 wt % to about 70 wt %, from about 0.1 wt % to about 50 wt %, or from about 1 wt % to about 30 wt % of liquid components other than water. The other liquid components can include organic co-solvent, surfactant, additive that inhibits growth of harmful microorganisms, viscosity modifier, pH adjuster, sequestering agent, preservatives, etc.

When present, organic co-solvent(s) can include highboiling solvents and/or humectants, e.g., aliphatic alcohols, aromatic alcohols, alkyl diols, glycol ethers, polyglycol ethers, 2-pyrrolidinones, caprolactams, formamides, acetamides, C6 to C24 aliphatic alcohols, e.g., fatty alcohols of medium (C6-C12) to long (C13-C24) chain length, or mixtures thereof. The organic co-solvent(s) in aggregate can be present from 0 wt % to about 50 wt % in the binding agent. In other examples, organic co-solvents can be present at from about 5 wt % to about 25 wt %, from about 2 wt % to about 20 wt %, or from about 10 wt % to about 30 wt % in the binding agent.

Particulate Build Materials

The particulate build material can include from about 80 wt % to 100 wt %, from about 90 wt % to 100 wt %, from about 95 wt % to 100 wt %, or from about 99 wt % to 100 wt % gas-atomized stainless steel particles. The gas-atomized stainless steel particles can have a D50 particle size from about 5 μm to about 20 μm, from about 8 μm to about 18 μm, or from about 10 μm to about 14 μm. The gas-atomized stainless steel particles can have a D90 particle size that can be from about 10 μm to about 30 μm, from about 15 μm to about 25 μm, or from about 20 μm to about 30 μm. As used herein, particle size can refer to a value of the diameter of spherical particles or in particles that are not spherical can refer to the equivalent spherical diameter of that particle. The particle size can be in a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). In these or other types of particle distributions, the particle size can be characterized in one way using the 50$^{th}$ percentile of the particle size, sometimes referred to as the "D50" particle size. For example, a D50 value of about 25 μm means that about 50% of the particles (by number) have a particle size greater than about 25 μm and about 50% of the particles have a particle size less than about 25 μm. Whether the particle size distribution is Gaussian, Gaussian-like, or otherwise, the particle size distribution can be expressed in terms of D50 particle size, which may usually approximate average particle size, but may not be the same. In examples herein, the particle size ranges can be modified to "average particle size," providing sometimes slightly different size distribution ranges.

The gas-atomized stainless steel particles can have an increased oxygen content, e.g. above 1,000 ppm. Increasing an oxygen content of stainless steel particles during gas atomization can reduce inter-particle friction and can thereby improve the overall flowability of the gas-atomized stainless steel particles and reduce clumping of the gas-atomized stainless steel particles. In some examples, an oxygen content of the gas-atomized stainless steel particles can range from about 1.5 times to about 5 times, from about 1.5 times to about 3 times, or from about 2 to 4 times the typical oxygen content, e.g., 700 ppm, of gas-atomized stainless steel particles. For example, an oxygen content of the gas-atomized stainless steel particles can range from about 1200 ppm to about 2200 ppm, from about 1400 pm to about 1800 ppm, or from about 1500 to about 2000 ppm.

In some examples, a carbon content of the gas-atomized stainless steel particles can be increased and/or a source of carbon, such as carbon particles, graphite particles, or a combination thereof, can be admixed into the particulate build material. Increasing carbon content or adding carbon to the particulate build material can contribute to reducing oxygen content in the fused three-dimensional object. In an example, an average carbon content of the gas-atomized stainless steel particles can range from about 50 ppm to about 1200 ppm. In yet other examples, an average carbon content of the gas-atomized stainless steel particles can range from about 500 ppm to about 1000 ppm, from about 250 ppm to about 750 ppm, from about 400 ppm to about 1200 ppm, or from about 50 ppm to about 300 ppm.

In an example, the gas-atomized stainless steel particles can include from about 3 wt % to about 15 wt % nickel and from about 10 wt % to about 20 wt % chromium. In another example, the gas-atomized stainless steel particles can include from about 10 wt % to about 15 wt % nickel, from about 15 wt % to about 20 wt % chromium, and from about 1.5 wt % to about 4 wt % molybdenum. In yet another example, the gas-atomized stainless steel particles can include from about 3 wt % to about 5 wt % nickel, from about 15 wt % to about 17 wt % chromium, from about 3 wt % to about 5 wt % copper, and from about 0.15 wt % to about 0.45 wt % niobium, tantalum, or a combination of niobium and tantalum. In a further example, the gas-atomized stainless steel particles can include from about 3 wt % to about 6 wt % nickel, from about 14 wt % to about 16 wt % chromium, and from about 2 wt % to about 5 wt % copper. In some examples, the gas-atomized stainless steel particles can further include from about 0.15 wt % to about 0.45 wt % niobium, tantalum, or a combination of niobium and tantalum. In another example, the gas-atomized stainless steel particles can further include from 0 wt % to about 2 wt % or from about 0.01 wt % to about 2 wt % manganese, from 0 wt % to about 1 wt % or from about 0.01 wt % to about 0.7 wt % phosphorus, from 0 wt % to about 0.05 wt % or from about 0.01 wt % to about 0.08 wt % sulfur, and/or from 0 wt % to about 2 wt % or from about 0.01 wt % to about 2 wt % silicon. In an example, the gas-atomized stainless steel particles can include 316, 316L, 17-4PH, 15-5PH, or an admixture of any or all of these particles.

The gas-atomized stainless steel particles can include austenitic stainless steel particles, ferritic stainless steel particles, martensitic steel particles, amorphous steel particles, or a combination thereof. As used herein, "austenitic" refers to an atomic arrangement that is a face-centered cubic crystal with one atom at individual corners of the crystal cube and one atom in the middle of the individual face of the crystal cube. As used herein, "ferritic" steels can have an atomic arrangement that is a body-centered cubic grain structure with a cubic atom cell that includes one atom in the center.

The gas-atomized stainless steel particles can be spherical, irregular spherical, rounded, semi-rounded, discoidal, angular, subangular, cubic, cylindrical, or any combination thereof. In one example, gas-atomized stainless steel particles can include spherical particles, irregular spherical particles, or rounded particles. In some examples, the shape of the gas-atomized stainless steel particles can be uniform, which can allow for relatively uniform melting or sintering of the particles. In an example, the gas-atomized stainless steel particles can have an average aspect ratio from about 1.2:1 to about 1:1, or from about 1.1:1 to about 1:1.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the "green" is used to describe any of a number of intermediate structures prior to particle to particle material fusing, e.g., green body object, green body article, green body layer, etc. As a "green" structure, the particulate build material can be (weakly) bound together by a binder. Typically, a mechanical strength of the green body is such that the green body can be handled or extracted from a particulate build material on a build platform to place in a fusing oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body object while contained therein, but the particulate build material is not part of the green structure unless the particulate build material is printed with a binding agent or some other fluid that is used to generate a solidified part prior to fusing, e.g., sintering, annealing, melting, etc.

As used herein, "kit" can be synonymous with and understood to include a plurality of compositions including multiple components where the different compositions can be separately contained (though in some instances co-packaged in separate containers) prior to use, but these components can be combined together during use, such as the three-dimensional object build processes described herein. The containers can be any type of a vessel, box, or receptacle made of any material.

As used herein, "applying" when referring to binding agent that may be used, for example, refers to any technology that can be used to put or place the fluid agent, e.g., binding agent, on the particulate build material or into a layer of particulate build material for forming a green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

The following illustrates an example of the present disclosure. However, it is to be understood that the following is illustrative of the application of the principles of the present disclosure. Numerous modifications and alternative compositions, methods, and systems may be devised without departing from the present disclosure. The appended claims are intended to cover such modifications and arrangements.

EXAMPLE

Two heat-fused three-dimensional objects were prepared using a layer-by-layer powder bed printing process. Specifically, two different particulate build material formulations were compared to determine object density after sintering to determine whether the increased oxygen content would adversely impact the overall part density. For this example, all of the particulate build materials selected for use included from 97 wt % to 99.8 wt % 316 stainless steel particles having a D50 particle size of 7 μm. The 316 stainless steel particles either had a typical oxygen content (Control particulate build material having about 700 ppm oxygen by weight) or an increased oxygen content (Example particulate build material having about 1,500 ppm oxygen by weight). The build process was as follows for the objects prepared:
1) Particulate build material was spread evenly on a build platform at an average thickness of about 70 μm to form a build material layer.
2) Binding agent including latex binder was selectively applied to portions of the respective build material layers at a latex polymer particle to particulate build material weight ratio of about 1:99.
3) The spreading of the particulate build material (1) and the application of the binding agent (2) was then repeated on a layer-by-layer basis until the respective green body object was formed having multiple layers.
4) The green body objects were then removed from their respective particulate build material powder beds and transferred to a fusing oven.
5) The green body objects were sintered in the fusing oven at a temperature of about 1,380° C. for about 2 hours to form a Control three-dimensional Object and an Example three-dimensional Object.
6) Following controlled cooling, the oxygen content of the two respective objects was measured using gas fusion methodology, and density of the objects was measured using Archimedes methods.

The Control three-dimensional Object had an overall oxygen content of 50 ppm and a density of 98% of theoretical density. The Example three-dimensional Object printed with particles having an increased oxygen content had an overall oxygen content of 300 PPM and a density 98% of theoretical density. The overall oxygen content of both the fused three-dimensional objects did not negatively affect mechanical strength of the fused three-dimensional objects. In addition, the Example particulate build material including increased oxygen content was more easily spread and did not exhibit any clumping during spreading when forming individual layers of the particulate build material of the powder bed, whereas the Control particulate build material including a more standard oxygen content exhibited poor flowability.

What is claimed is:

1. A three-dimensional printing kit, comprising:
a binding agent including latex polymer particles dispersed in a liquid vehicle, wherein the latex polymer particles have an average particle size ranging from about 500 nm to about 1 μm and the liquid vehicle is present in an amount ranging from about 50 wt % to about 99 wt % based on a weight of the binding agent as a whole; and
a particulate build material including from about 80 wt % to 100 wt % gas-atomized stainless steel particles, wherein the gas-atomized stainless steel particles include from about 3 wt % to about 15 wt % of nickel and from about 10 wt % to about 20 wt % of chromium, and wherein an average oxygen content of the gas-atomized stainless steel particles ranges from about 1200 ppm to about 2200 ppm by weight.

2. The three-dimensional printing kit of claim 1, wherein the binding agent includes from about 2 wt % to about 30 wt % of the latex polymer particles.

3. The three-dimensional printing kit of claim 1, wherein the gas-atomized stainless steel particles have a D50 particle size ranging from about 5 μm to about 20 μm.

4. The three-dimensional printing kit of claim 1, wherein the gas-atomized stainless steel particles have a D90 particle size ranging from about 10 μm to about 30 μm.

5. The three-dimensional printing kit of claim 1, wherein the average oxygen content of the gas-atomized stainless steel particles ranges from about 1400 ppm to about 1800 ppm by weight.

6. The three-dimensional printing kit of claim 1, wherein the gas-atomized stainless steel particles include an average carbon content ranging from about 50 ppm to about 1200 ppm by weight.

7. The three-dimensional printing kit of claim 1, wherein the gas-atomized stainless steel particles include from about 10 wt % to about 15 wt % of nickel, from about 15 wt % to about 20 wt % of chromium, and from about 1.5 wt % to about 4 wt % of molybdenum.

8. The three-dimensional printing kit of claim 1, wherein the gas-atomized stainless steel particles include from about 3 wt % to about 5 wt % of nickel, from about 15 wt % to about 17 wt % of chromium, from about 3 wt % to about 5 wt % of copper, and from about 0.15 wt % to about 0.45 wt % of niobium, tantalum, or a combination of niobium and tantalum.

9. The three-dimensional printing kit of claim 1, wherein the gas-atomized stainless steel particles have an average aspect ratio from about 1.2:1 to about 1:1.

10. A method of three-dimensional printing, the method comprising:
iteratively applying individual build material layers of a particulate build material including from about 80 wt % to 100 wt % of gas-atomized stainless steel particles, wherein the gas-atomized stainless steel particles include from about 3 wt % to about 15 wt % of nickel and from about 10 wt % to about 20 wt % of chromium, and wherein an oxygen content of the gas-atomized stainless steel particles ranges from about 1200 ppm to about 2200 ppm by weight;
based on a three-dimensional object model, iteratively applying a binding agent to the individual build material layers to define individually patterned object layers that become adhered to one another to form a layered green body object, the binding agent including latex polymer particles dispersed in a liquid vehicle, wherein the latex polymer particles have an average particle size ranging from about 500 nm to about 1 μm and the liquid vehicle is present in an amount ranging from about 50 wt % to about 99 wt % based on a weight of the binding agent as a whole; and sintering the layered green body object in a fusing oven to form a fused three-dimensional object.

11. The method of claim 10, wherein the gas-atomized stainless steel particles have a D50 particle size ranging from about 5 μm to about 20 μm.

12. The method of claim 10, wherein the sintering occurs in an atmosphere containing from about 2.4 vol % to 100 vol % of hydrogen.

13. The method of claim 10, wherein the fused three-dimensional object has an average oxygen content per fused particle ranging from about 100 ppm to about 800 ppm by weight.

14. A three-dimensional printing system, comprising:
- a supply containing a particulate build material including from about 80 wt % to 100 wt % of gas-atomized stainless steel particles having a D50 particle size ranging from about 5 μm to about 20 μm, wherein the gas-atomized stainless steel particles include from about 3 wt % to about 15 wt % of nickel and from about 10 wt % to about 20 wt % of chromium, and wherein an average oxygen content of the gas-atomized stainless steel particles ranges from about 1200 ppm to about 2200 ppm by weight; and
- a fluid applicator fluidly coupled or coupleable to a binding agent to apply the binding agent to the particulate build material to form a layered green body object, wherein the binding agent includes latex polymer particles dispersed in a liquid vehicle, the latex polymer particles having an average particles size ranging from about 500 nm to about 1 μm, and wherein the liquid vehicle is present in an amount ranging from about 50 wt % to about 99 wt % based on a weight of the binding agent as a whole.

15. The system of claim 14, further comprising a fusing oven to fuse the gas-atomized stainless steel particles to a temperature where inter-particle fusion occurs and fused gas-atomized stainless steel particles have an average oxygen content ranging from about 400 ppm to about 800 ppm by weight.

* * * * *